// document

(12) United States Patent
Lin

(10) Patent No.: US 11,822,632 B2
(45) Date of Patent: Nov. 21, 2023

(54) METHODS, MECHANISMS, AND COMPUTER-READABLE STORAGE MEDIA FOR UNLOCKING APPLICATIONS ON A MOBILE TERMINAL WITH A SLIDING MODULE

(71) Applicant: BEIJING XIAOMI MOBILE SOFTWARE CO., LTD., Beijing (CN)

(72) Inventor: Zhaoqin Lin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 643 days.

(21) Appl. No.: 16/518,765

(22) Filed: Jul. 22, 2019

(65) Prior Publication Data

US 2020/0125707 A1    Apr. 23, 2020

(30) Foreign Application Priority Data

Oct. 19, 2018    (CN) .......................... 201811224782.1

(51) Int. Cl.
  G06F 3/048     (2013.01)
  G06F 21/32     (2013.01)
  G06F 1/16      (2006.01)
  G06F 3/04847   (2022.01)
  G06F 3/0488    (2022.01)
  (Continued)

(52) U.S. Cl.
  CPC ............ *G06F 21/32* (2013.01); *G06F 1/1624* (2013.01); *G06F 3/0488* (2013.01); *G06F 3/04847* (2013.01); *G06V 40/166* (2022.01); *G06V 40/172* (2022.01); *H04N 23/57* (2023.01); *H04N 23/611* (2023.01)

(58) Field of Classification Search
  CPC .... G06F 21/32; G06F 1/1624; G06F 3/04847; G06F 3/0488; G06V 40/172; G06V 10/751; G06V 40/166; H04N 5/2257; H04N 5/23219
  See application file for complete search history.

(56) References Cited

U.S. PATENT DOCUMENTS

2010/0216447 A1* 8/2010 Park ................... H04M 1/0235
                                                          455/418
2011/0300831 A1* 12/2011 Chin ..................... H04W 12/06
                                                          345/173
(Continued)

FOREIGN PATENT DOCUMENTS

CN    102855062 A    1/2013
CN    105760736 A    7/2016
(Continued)

OTHER PUBLICATIONS

First office action of Chinese application No. 201811224782.1 dated Apr. 22, 2020.
(Continued)

*Primary Examiner* — Aleksey Olshannikov
(74) *Attorney, Agent, or Firm* — SYNCODA LLC; Feng Ma

(57) ABSTRACT

A method for unlocking an application on a mobile terminal can include calling a front-facing camera of the mobile terminal to capture a face image of the user in response to a sliding action applied on a sliding module of the mobile terminal; and unlocking a preset application by using the captured face image as an unlocking key.

20 Claims, 9 Drawing Sheets

(51) Int. Cl.
G06V 40/16 (2022.01)
H04N 23/57 (2023.01)
H04N 23/611 (2023.01)

(56) References Cited

U.S. PATENT DOCUMENTS

| | | | | |
|---|---|---|---|---|
| 2014/0267874 | A1* | 9/2014 | Ratcliff | H04N 5/2254 |
| | | | | 348/335 |
| 2016/0063234 | A1* | 3/2016 | Charng | G06V 40/171 |
| | | | | 726/19 |
| 2017/0126979 | A1 | 5/2017 | Evans, V et al. | |
| 2018/0137268 | A1* | 5/2018 | Sawant | G06F 21/36 |
| 2018/0367656 | A1* | 12/2018 | Kim | G06V 40/161 |
| 2019/0080120 | A1* | 3/2019 | Wang | G06V 10/751 |
| 2019/0373141 | A1* | 12/2019 | Xu | H04N 5/23216 |

FOREIGN PATENT DOCUMENTS

| | | |
|---|---|---|
| CN | 106372493 A | 2/2017 |
| CN | 107590375 A | 1/2018 |
| CN | 108133129 A | 6/2018 |
| CN | 105760736 B | 9/2018 |
| CN | 108600523 A | 9/2018 |
| EP | 3454240 A1 | 3/2019 |

OTHER PUBLICATIONS

Extended European search report of counterpart EP application No. 19193165.8 dated Feb. 26, 2020.
Third office action of Chinese application no. 201811224782.1 dated Apr. 8, 2021.

* cited by examiner

METHODS, MECHANISMS, AND COMPUTER-READABLE STORAGE MEDIA FOR UNLOCKING APPLICATIONS ON A MOBILE TERMINAL WITH A SLIDING MODULE

CROSS-REFERENCE TO RELATED APPLICATION

This application claims priority to Chinese Patent Application 201811224782.1 filed on Oct. 19, 2018, the content of which is hereby incorporated by reference in its entirety.

BACKGROUND

As people's living standards improve, mobile terminals have become indispensable in people's daily lives.

Various applications can be installed on mobile terminals, so that people's daily lives are greatly enriched. To protect the privacy and account security of a user, some applications in mobile terminals need to be unlocked, after they are started, before entering main interfaces thereof and normal use. For example, when a user launches a payment application, the user may be presented with an unlocking interface of the payment application and required to input an unlocking password or gesture on the unlocking interface in order to unlock the payment application.

SUMMARY

The present disclosure relates to the field of mobile terminal technology, and in particular, to methods, device, and computer-readable storage medium for unlocking application(s) on mobile terminals.

Various embodiments of the present disclosure provide a method, device, and computer-readable storage medium for efficiently unlocking application(s) on a mobile terminal while maintaining a high-level of security.

According to a first aspect of the present disclosure, a method for unlocking an application on a mobile terminal is provided. Mobile terminals usable with this method generally has a sliding module with a front-facing camera disposed thereon. Methods in accordance with this aspect of the disclosure generally includes the steps of calling the front-facing camera to capture a face image in response to a sliding action applied on the sliding module; and unlocking an application of the mobile terminal by using the captured face image as an unlocking key. The application is preferably a preset application.

In one implementation, the step of calling the front-facing camera includes first detecting to see whether any face is in the current image frame of the camera; and capturing the face image if it is in the current image frame of the camera.

In one implementation, the step of unlocking the application may include comparing features between the captured face image a preset face image to obtain a comparison result; and unlocking the present application if the comparison result indicates that the captured face image and the preset face image are from the same person. Here the identity of the face images may be determined by a matching analysis. If the degree of match between the two images exceed a predetermined level, the two images are said to be from the same person.

In some implementations, launching or starting of an application may not be coincidental with unlocking of the application. That is to say, access permission of an application may be managed separately from execution permission, meaning that an application may be started in a locked state or unlocked state. Accordingly, in one implementation, when a sliding action is detected, the preset application is started and unlocking of the application is carried out as part of the application starting process.

In some implementations, the mobile terminal may have more than one preset applications. In such implementations, the sliding action and the preset application may not have a one-to-one relationship. A user will then have the opportunity to decide which preset application is activated when a sliding action is applied. One way that the preset applications may be mapped to one sliding action is by using the face image as a secondary selection criterion. This way, a mobile terminal may have multiple users, each may have a different preset application. Accordingly, in one implementation, the step of unlocking the preset application may include the further steps of selecting a preset application that corresponds to a preset face image matching the captured face image; and starting the selected preset application and accessing a main interface of the selected preset application.

In some implementations, the threshold of face image comparison may be set at a high level to ensure high level of security. This may result in false negative results in which a user may be denied access to the application even though it is the same user. Thus, in one implementation, if the comparison result indicates that the captured face image and the preset face image are from different persons, a touch-based unlocking interface may be presented to provide a secondary means of gaining access to the application.

In some implementations, the sliding module is configured such that it has a retracted configuration and an exposed configuration, and that it can be moved between these two configurations in a sliding action. When in the retracted configuration, the front-facing camera located on the sliding module is hidden from view. When in the exposed configuration, the front-facing camera is exposed to the outside and ready to take pictures. The sliding actions can be detected in a number of ways, including mechanical, electrical, optical, and other means. In one implementation, a Hall sensor is used in conjunction with a magnet strategically placed on the mobile terminal or the sliding module so that any sliding movement of the sliding module is detected by the magnet/Hall sensor pair. Detection of such a sliding action is indicated by the generation of a sliding event parameter. Accordingly, in one implementation, the method further includes the steps of receiving a sliding event parameter generated by a Hall sensor in the mobile terminal; and determining whether a sliding action has occurred according to the sliding event parameter.

In some implementations, the choice of preset applications is not permanent and can be changes. Accordingly, in one implementation, the method further includes the steps of acquiring a user selection instruction encoding a selection of an application as a preset application; and setting the application selected by the user selection instruction as the preset application. User selection instructions may be obtained by a selection interface such as a menu list, dropdown list, or some other suitable user interface known in the art.

In some embodiments of the present disclosure, the triggering event can be sliding a screen, turning a wheel, or sliding a cover of the mobile device, etc. Once the triggering event is detected, the front camera of the mobile terminal can be exposed. At this time, a face image is acquired by the front camera, and is adopted to unlock an application. In the process of using the application, a user only needs to conduct a cover sliding action, and does not need to perform operation steps such as searching for the application in the mobile terminal, clicking the application, inputting some items to unlock, and the like. Therefore, the operation is simple and convenient, and may save time and labor.

In an implementation, the calling a camera of a mobile terminal to acquire a face image includes: detecting whether there is a face in a picture currently shot by the camera of the mobile terminal; and shooting the face image when there is a face in the picture currently shot by the camera of the mobile terminal.

In this implementation, a face image is automatically shot by the mobile terminal without a user's operation, so that the unlocking process is greatly simplified.

In an implementation, the unlocking a preset application by using the face image includes comparing features between the face image and a preset face image to obtain a comparison result; and unlocking the preset application when the comparison result indicates that the face image and the preset face image are from the same person.

In this implementation, the face image shot by the front camera is compared with the preset face image in the mobile terminal to unlock the application. The application can be unlocked successfully only when the face image as shot and the preset face image are from the same person, thereby ensuring the security.

In an implementation, the method further includes: starting the preset application in response to the cover sliding action on the mobile terminal, and wherein unlocking the preset application includes: unlocking the preset application in a starting process of the preset application.

In this implementation, once a cover sliding action occurs on the mobile terminal, an application required to be unlocked can be started immediately. After a face image is shot and the comparison is authenticated, the started preset application could be unlocked. Thus, the whole process is simple and convenient.

In an implementation, unlocking the preset application includes: determining a preset application corresponding to a preset face image that is from the same person as the face image, at least two preset applications being set in the mobile terminal, and starting the preset application and accessing a main interface of the preset application.

In this implementation, different unlocking face images can be set for different preset applications, so that the present solution could be applied to multiple applications at one time.

In an implementation, the method further includes: outputting a touch unlocking interface when the comparison result indicates that the face image and the preset face image are from different persons.

In this implementation, when the unlocking by face image fails, an unlocking interface may be output for the user to perform password or gesture unlocking, so as to improve the diversity of unlocking manners.

In an implementation, the method further includes: receiving a sliding event parameter generated by a Hall sensor in the mobile terminal, and determining whether a cover sliding action occurs on the mobile terminal according to the sliding event parameter.

In this implementation, when a user conducts a cover sliding action, the Hall sensor in the mobile terminal would detect the cover sliding action, so that the mobile terminal could perform subsequent operations.

In an implementation, the method further includes: acquiring a user selection instruction configured to select an application; and setting the application selected by the user selection instruction as the preset application.

In this implementation, by setting in advance, the user may select the application that will be started when a cover sliding action occurs. As such, the user can make a selection in accordance with requirement, and can use different preset applications at different times. Thus, the user's requirement on starting applications conveniently could be met.

In another aspect of the present disclosure, a device for unlocking an application is provided, the device includes: an acquiring unit, configured to call a camera of a mobile terminal to acquire a face image in response to a cover sliding action on the mobile terminal; and an unlocking unit, configured to unlock a preset application by using the face image.

In an implementation, the acquiring unit is configured to detect whether there is a face in a picture currently shot by the camera of the mobile terminal, and shoot the face image when there is a face in the picture currently shot by the camera of the mobile terminal.

In an implementation of the present disclosure, the unlocking unit is configured to compare features between the face image and a preset face image to obtain a comparison result, and unlock the preset application when the comparison result indicates that the face image and the preset face image are from the same person.

In an implementation of the present disclosure, the unlocking unit is further configured to start the preset application in response to the cover sliding action on the mobile terminal, and unlock the preset application in a starting process of the preset application when the comparison result indicates that the face image and the preset face image are from the same person.

In an implementation of the present disclosure, the unlocking unit is configured to determine a preset application corresponding to a preset face image that is from the same person as the face image, at least two preset applications being set in the mobile terminal, and the unlocking unit is configured to start the preset application and access a main interface of the preset application.

In an implementation of the present disclosure, the unlocking unit is further configured to output a touch unlocking interface when the comparison result indicates that the face image and the preset face image are from different persons.

In an implementation of the present disclosure, the device further includes: a detecting unit, configured to receive a sliding event parameter generated by a Hall sensor in the mobile terminal, and determine whether a cover sliding action occurs in the mobile terminal according to the sliding event parameter.

In an implementation of the present disclosure, the device further includes: a setting unit, configured to acquire a user selection instruction for selecting an application, and set the application selected by the user selection instruction as the preset application.

In yet another aspect of the present disclosure, a device for unlocking an application is provided, and the device includes: a processor; and a memory configured to store instructions executable by the processor, wherein the processor is configured to: start a preset application in response to a cover sliding action on a mobile terminal, call a camera of the mobile terminal to acquire a face image, and unlock the preset application by using the face image.

In yet another aspect of the present disclosure, a computer-readable storage medium is provided, wherein instructions stored in the computer-readable storage medium, when executed by a processor of a device for unlocking an application, cause the unlocking device to execute a method for unlocking an application of the first aspect including calling a camera of a mobile terminal to acquire a face image in response to a cover sliding action on the mobile terminal; and unlocking a preset application by using the face image.

It is to be understood that, both the foregoing general description and the following detailed description are exemplary and explanatory only and are not restrictive of the present disclosure.

BRIEF DESCRIPTION OF THE DRAWINGS

The drawings herein are incorporated in and constitute a part of this specification of the present disclosure, showing examples consistent with the present disclosure, and explaining the principles of the present disclosure together with the specification.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

Methods for unlocking an application on a mobile terminal in accordance with embodiments of the present disclosure may be based on a sliding-style mobile terminal which is generally an all-screen mobile terminal having a full screen with a 100% screen-to-body ratio. As the screen of the mobile terminal encompasses the entire front surface of the mobile terminal, how to set the position of a front-facing camera on the mobile terminal becomes a problem. As will be demonstrated below, a sliding-style mobile terminal having a sliding module that can slide vertically relative to the screen offers a viable solution to the aforementioned problem. The sliding-style mobile terminal will be briefly introduced below with reference to the accompanying drawings.

The inventor of the present disclosure has recognized that, the conventional process of unlocking an application is very tedious, in view that many steps such as searching for an application in the mobile terminal, clicking on the application to launch it and then entering a password to unlock it are all required, which results in a time-consuming and laborious process when using the application.

Figure 1:
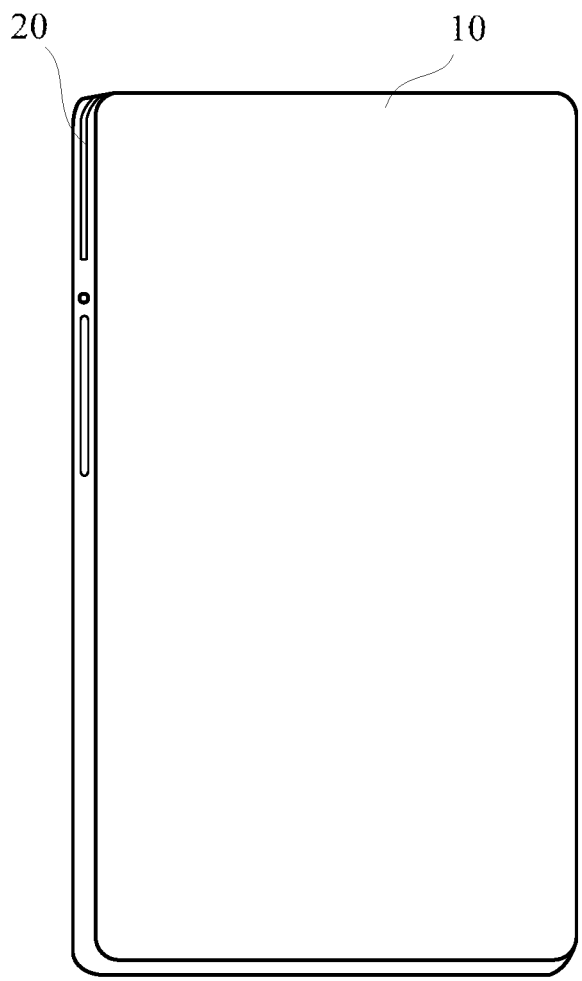
FIG. 1 is a front view of a mobile terminal according to one exemplary embodiment of the disclosure.
Figure 2:
FIG. 2 is a side view of the same mobile terminal with the sliding module in a retracted configuration.
Figure 3:
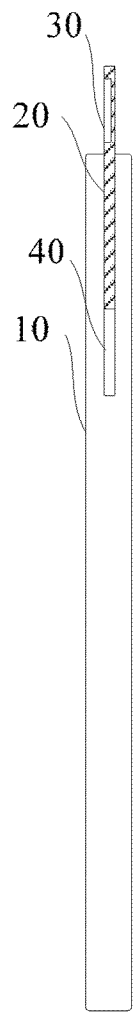
FIG. 3 is another side view of the same mobile terminal with the sliding module in an extended, protruding configuration, exposing a front-facing camera disposed thereon.

FIG. 1 shows a front view of a sliding-style mobile terminal according to one exemplary embodiment of this disclosure. Referring to FIG. 1, the mobile terminal 10 has a front surface and a rear surface, wherein the front surface is the screen of the mobile terminal. A sliding module 20 that can be slid vertically relative to the screen of the mobile terminal 10. FIGS. 2 and 3 are side views of the mobile terminal 10 shown in FIG. 1. Referring to FIGS. 2 and 3, a front-facing camera 30 is located on the sliding module 20. When the front-facing camera 30 is not use during operation of the mobile terminal 10, the sliding module 20 is in a retracted state, namely, inside the mobile terminal. In this state, the entire configuration of the mobile terminal 10 is as shown in FIGS. 1 and 2. When use of the front-facing camera 30 is required, the sliding module 20 could be slid upward to be in a protruding state. In this state, the front-facing camera 30 becomes exposed from the mobile terminal, as shown in FIG. 3, so that the front-facing camera 30 can be used to take photographs.

The various device components, blocks, or portions may have modular configurations, or are composed of discrete components, but nonetheless may be referred to as "modules" in general. In other words, the "modules" referred to herein may or may not be in modular forms.

In some embodiments, such as those illustrated in FIG. 1, the sliding module 20 can be an insert or a block slidably coupled to a frame of the mobile terminal 10. The sliding module 20 can be made of a material similar or the same as that of the frame, such as plastic, metal, composite, etc.

In some other embodiments, the sliding module 20 can be implemented with part of a touch screen of the mobile terminal 10. For example, by sliding the sliding module on the touch screen, a cover portion of the front-facing camera 30 can become transparent, thereby "exposing" the front-facing camera 30. On the other hand, an opposite sliding motion or a command input to the mobile terminal 10 can cause the cover portion to become opaque, thereby "hiding" or turning off the front-facing camera 30.

Therefore, the sliding module 20 can be implemented with mechanical moving parts, or electronically with the screen of the mobile terminal 10 to realize similar functions of hiding and exposing the front-facing camera 30.

In the mobile terminal 10 shown in FIG. 1, the sliding module 20 is sandwiched between the front surface and back surface of the mobile terminal 10. Accordingly, a sliding groove 40 is formed between the screen and a rear cover of the mobile terminal 10. When a sliding action is applied to the sliding module 20, it moves vertically along the sliding groove 40.

In some other embodiments, the sliding groove 40 may also be located at other positions of the mobile terminal 10, for example, at the rear cover of the mobile terminal 10. The sliding-style mobile terminal described in the present disclosure does not put a limitation on the specific structure and position of the sliding cover, as long as the mobile terminal can realize a function of hiding and exposing the front-facing camera through the sliding action applied to the sliding module.

A mobile terminal may have many applications installed thereon, such as Camera, Contact, WeChat, Weibo, SMS, Alipay, Photo album, Browser and the like. Among these applications, at least some may require access control and need to be unlocked before being accessed. Such applications may be ones which deal with private information of the user that require privacy protection. Examples may include Alipay, photo album or the like.

Exemplary mobile terminals of the present disclosure may include, but are not limited to, a cell phone, a tablet PC, and the like.

Figure 4:
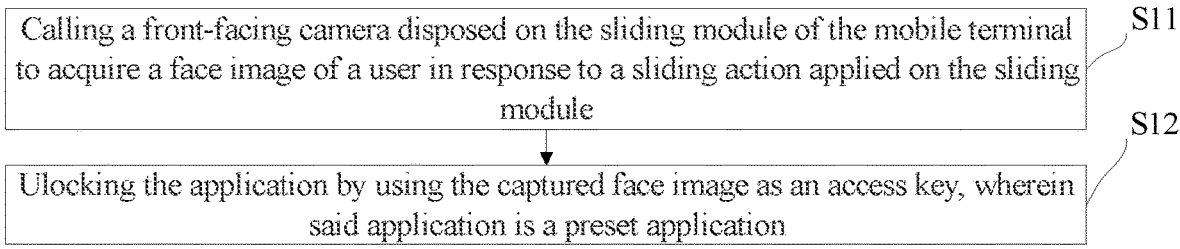
FIG. 4 is a flowchart showing a method for unlocking an application on a mobile terminal with a sliding module according to one exemplary embodiment.

FIG. 4 shows a flowchart diagram illustrating a method for unlocking an application on a mobile terminal according to some exemplary embodiments of the disclosure. The method may be executed by a mobile terminal. Referring to FIG. 4, the method for unlocking an application includes the following steps.

In step S11, a front-facing camera of the mobile terminal is called to capture a face image of the user in response to a sliding action applied to the sliding module of the mobile terminal.

In this step, the term "sliding action" refers to an action of exposing the front-facing camera by slidably moving the sliding module. This action can be detected by a Hall sensor within the mobile terminal through detecting the position of the sliding module.

In step S11, the front-facing camera is exposed to the outside and, in this state, the front-facing camera is activated to capture the user's face image.

In one exemplary embodiment, when a sliding action occurs on the mobile terminal, the mobile terminal may launch, but does not directly access, a preset application (for example, by not displaying an unlocking interface of the preset application but only displaying a starting interface of the preset application); and an unlocking processes in steps S11 and S12 may be proceeded while starting the preset application. If unlocking is successful, a main interface of the preset application is presented. In another alternate embodiment, when a sliding action occurs on the mobile terminal, the mobile terminal may not start the preset application until the unlocking is successful, but automatically starts the preset application and access the main interface of the preset application once successful unlocking is achieved.

In step S12, a preset application is unlocked by using the face image as an unlocking key.

In some embodiments, a preset application is selected in advance and can be unlocked by calling a camera through the sliding action to capture a face image of the user.

In some embodiments, the manner for unlocking an application is by using the captured face image as an unlocking key to automatically unlock the application, rather than conventional manners of using password, gesture or fingerprint, so that a user needs not taking any additional operations to unlock the application.

In some embodiments, when a sliding action is applied to the sliding module, the front-facing camera of the mobile terminal is exposed. In this state, a face image of the user is captured by the front-facing camera and is used as an unlocking key to unlock an application. In order to use the application, a user only needs to apply a sliding action to the sliding module and does not need to perform operation steps such as searching for the application in the mobile terminal, clicking the application, inputting some items to unlock, and the like. Therefore, the operation is simple and convenient, and may save time and labor.

In some further embodiments, calling a camera of a mobile terminal to capture a face image includes: detecting whether there is a face in the current image frame of the front-facing camera of the mobile terminal; and capturing the face image when there is a face in the current image frame of the front-facing camera of the mobile terminal. Throughout this disclosure, the terms "acquiring" and "capturing" are used interchangeably in the context of taking photos with a camera.

In the above embodiment, a face image is automatically captured by the mobile terminal without a user's command, so that the unlocking process is greatly simplified.

In still some further embodiments, unlocking a preset application by using the face image comprises: comparing features between the face image and a preset face image to obtain a comparison result, the preset face image being regarded as an unlocking password of the preset application; unlocking the preset application when the comparison result indicates that the face image and the preset face image are from the same person; and showing that the unlocking of the preset application fails when the comparison result indicates that the face image and the preset face image are from different persons.

In the above further embodiments, the face image captured by the front-facing camera is compared with the preset face image in the mobile terminal to unlock the application. The application can be unlocked successfully only when the captured face image and the preset face image are from the same person, thereby ensuring security of the application.

In some further embodiments, the method further includes: launching the preset application in response to a sliding action applied on the sliding module; and unlocking the preset application, which includes unlocking the preset application in a launching process thereof.

Here, a launching process may include unlocking the preset application while displaying the starting interface at the same time.

In this embodiment, once a sliding action is applied on the sliding module, an application required to be unlocked can be launched immediately. After a face image is captured and the comparison is authenticated, the launched preset application could be unlocked. Thus, the whole process is simple and convenient.

In still some further embodiments, the mobile terminal has at least two preset applications and the step of unlocking the preset application includes: selecting a preset application that corresponds to a preset face image matching the captured face image; and starting the selected preset application and accessing the main interface thereof. In other words, each preset application will have a corresponding preset face image. A preset application is only selected if its corresponding preset face image matches the captured face image. Once a preset application is selected via the matching computation, the application's main interface is also accessed.

In these embodiments, different unlocking face images can be set for different preset applications, so that the present solution could be applied to multiple applications at one time.

In yet still other embodiments, the method further includes: showing that the unlocking of the preset application fails and presenting a touch-based unlocking interface when the comparison result indicates that the face image and the preset face image are from different persons.

In these embodiments, when unlocking by face image fails, an unlocking interface may be presented for the user to perform password or gesture unlocking, so as to increase the diversity of unlocking manners.

In some more embodiments, the method further includes: receiving a sliding event parameter generated by a Hall sensor in the mobile terminal; and determining whether a sliding action has occurred in accordance with the sliding event parameter.

In these embodiments, when a user applies a sliding action to the sliding module, the Hall sensor in the mobile terminal would detect the sliding action, which in turn triggers subsequent operations to be performed by the mobile terminal.

In some embodiments, the method further includes: acquiring a user selection instruction which directs the mobile terminal to select an application; and setting the application selected by the user selection instruction as the preset application.

In these embodiments, by configuring the settings in advance, the user may select an application that will be launched when a sliding action occurs. As such, the user can make a selection in accordance with user preferences or requirements, and can change the choice of preset applications at different times. Thus, a user's preferred application can be coupled to the sliding action, providing a convenient and secure mechanism to launch an application according to the user's preference and choice.

It should be noted that the foregoing steps S11-S12 and the above embodiments may be advantageously combined in any combination.

Figure 5:
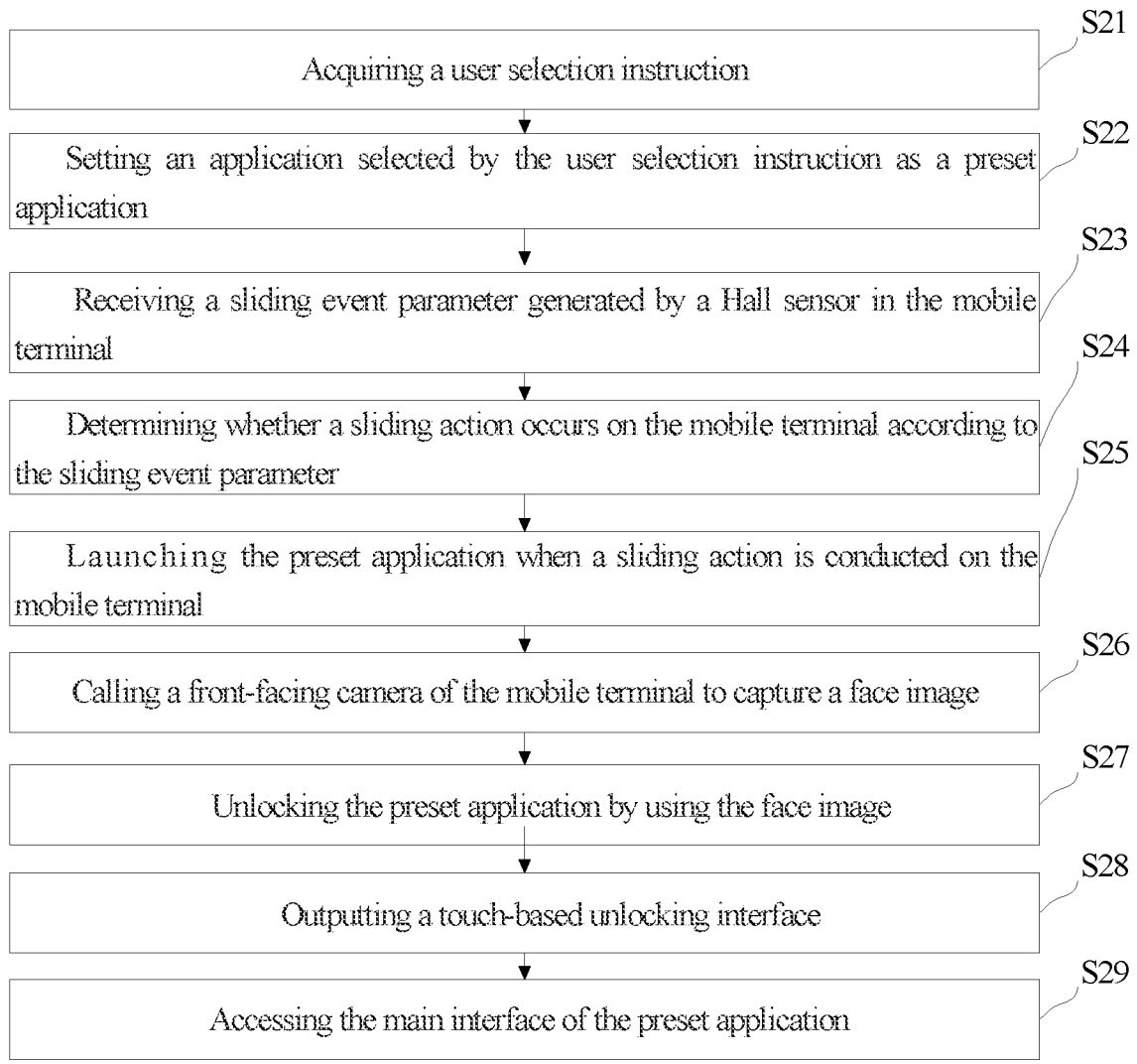
FIG. 5 is a flowchart of another method for unlocking an application on a mobile terminal with a sliding module according to another exemplary embodiment.

FIG. 5 is a flowchart of a method for unlocking an application on a mobile terminal according to an exemplary embodiment of this disclosure. In this embodiment, the method is executed by the mobile terminal and there is only one preset application. Referring to FIG. 5, the method for unlocking an application includes the following steps.

In step S21, a user selection instruction is acquired.

The user selection instruction includes an application identifier, which is configured to set the application indicated by the application identifier as the preset application.

In some embodiments, the preset application is an application that is selected in advance and can call a camera to capture a face image for unlocking via a sliding action.

A setting option of the mobile terminal includes an item for setting the preset application, which, for example, may be named as a privacy application starting item. A user can select an application as the preset application through the preset application setting item.

When a user issues a preset application selection instruction to the mobile terminal by clicking on the preset application setting item, a menu list including some or all applications installed on the mobile terminal would be displayed; and the user may set the preset application by clicking on an application in the menu list. The privacy application starting item has at least one default preset application. When the user does not make a selection, a default preset application, such as photo, address book or the like, may be chosen by default.

Figure 6:
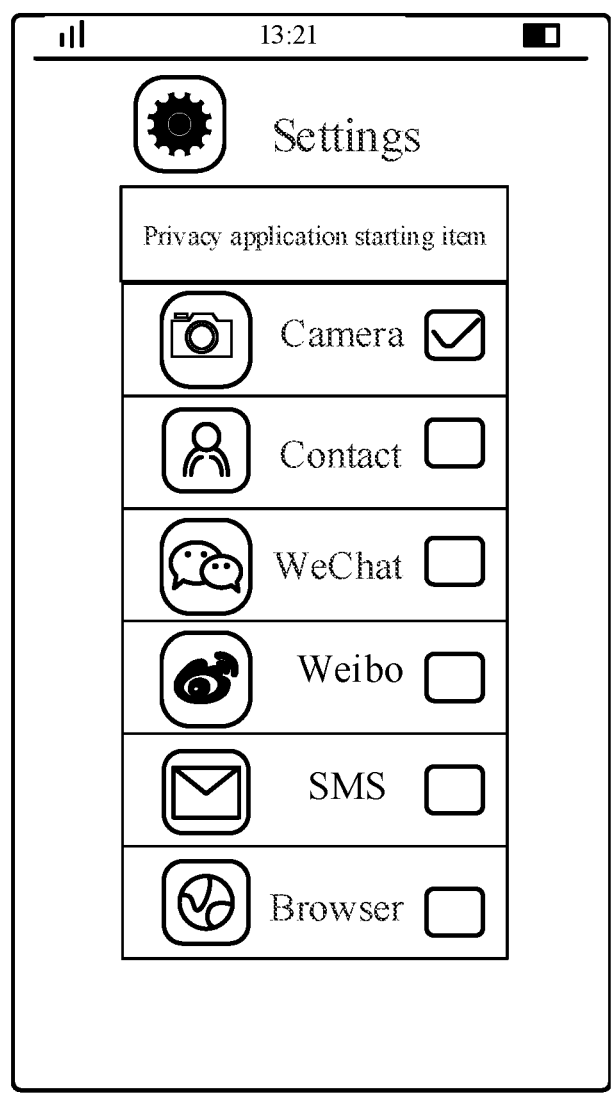
FIG. 6 is a schematic view illustrating a user interface of a menu list interface showing a list of privacy application starting items according to an exemplary embodiment.

FIG. 6 is a schematic drawing showing an interface with a menu list that enumerates privacy application starting items according to an exemplary embodiment. Referring to FIG. 6, the menu list of the privacy application starting items includes Camera, Contacts. WeChat, Weibo, SMS, Browser and the like as options. The user may select an application by clicking the checkbox next to it. The selected application, e.g. the Camera application shown in FIG. 6, will then be used as a preset application coupled to the sliding action.

Further, the privacy application starting item may also be enabled or disabled by selection. Only when the privacy application starting item is enabled will the mobile terminal perform the method for unlocking an application provided in steps S21-S29. When the privacy application starting item is disenabled, the mobile terminal will not perform the method for unlocking an application provided in steps S21-S29.

In step S22, an application selected by the user selection instruction is set as a preset application.

In some embodiments, by choosing the settings in advance, a user may select an application that will be launched when a sliding action occurs. As such, the user can make a selection in accordance with the user's preference and requirement. The user can also change the selected preset applications at different times. Thus, the user's requirement to launch applications conveniently could be met.

In some embodiments, steps S21 and S22 may be executed repeatedly, and the preset application is an application selected by the user for the last time. The preset application may consist at least one of the Camera, Contacts, WeChat, Weibo, SMS, Browser and the like.

In a preferred embodiment, the preset application is one application.

In step S23, a sliding event parameter generated by a Hall sensor in the mobile terminal is received.

In this step, the sliding action is an action that exposes the front-facing camera by slidably moving the sliding module, the change of position of which can be detected by a Hall sensor in the mobile terminal arranged at a rear cover of the mobile terminal. Accordingly, the sliding module is provided with a magnet. When the module slides, a magnetic field is generated by the magnet changes. The Hall sensor detects the sliding action by detecting the change of the magnetic field and generates a sliding event parameter.

In some embodiments, a processor of the mobile terminal acquires the sliding event parameter generated by the Hall sensor in the mobile terminal through a listener. In the mobile terminal, the sensor is managed by a sensor manager in the mobile terminal. Therefore, the processor of the mobile terminal needs to acquire a sensor service from the sensor manager, and registers the listener with the sensor manager through the sensor service. Thus, when there is a sliding event, the sensor process will notify the mobile terminal through the listener.

An android operating system is taken as example in which the processor can acquire the sensor service from the sensor manager by executing the following codes, and then register the listener.

mSensorManager=(SensorManager)context.getSystemService(Context.SENSOR_SERVICE);
// acquiring the SENSOR_SERVICE from the SensorManager
mSensor=mSensorManager.getDefaultSensor(SLIDE_COVER_SENSOR_TYPE,

```
true);//acquiring a Hall sensor parameter for detecting the cover sliding action
mSensorManager.registerListener(mListener,mSensor,SensorManager.SENSOR_DELAY_NORMAL,mHandler);
    //registering the SensorEventListener
Private final SensorEventListener mListener = new SensorEventListener( ) {
    @Override
    Public void onSensorChanged(SensorEvent event) {
//When the user slides the cover and the parameter SensorEvent event sent by the Hall
    sensor changes, the SensorEventListener outputs the parameter SensorEvent event
        }
 }
```

The Hall sensor notifies whether a sliding action has occurred currently by reporting the parameter SensorEvent event. The value of the parameter SensorEvent event indicates whether a cover sliding action occurs. The parameter SensorEvent event includes a parameter value; and different values of the parameter correspond to different positions of the sliding module on which the front-facing camera locates. Therefore, the position of the module of the front-facing camera can be determined in accordance with the value of the parameter. That is, whether a sliding action has occurred can be determined.

In step S24, whether a sliding action has occurred is determined in accordance with the sliding event parameter.

In this step, the processor determines whether a sliding action has occurred through a listener.

When the value of the SensorEvent event reported by the Hall sensor to the listener corresponds to a true sliding action, the listener outputs the parameter SensorEvent event to the processor, and the processor can determine whether a sliding action has occurred in accordance with the parameter SensorEvent event.

In step S25, when a sliding action has occurred, the preset application is launched.

In this step, after the application is launched, the unlocking process of steps S26 and S27 is executed instead of directly allowing the user to access the application. In this unlocking process, the screen may show a starting interface, which may be a starting interface of an application (also commonly known as a loading interface or a splash screen), such as the photo of the earth displayed in the loading process of WeChat.

When a user slides the sliding module, the Hall sensor in the mobile terminal detects the sliding action and generates a sliding-type event. When the processor of the mobile terminal receives the sliding-type event, it determines that the Hall sensor detects a sliding action on the mobile terminal; and then, a preset application is launched and the subsequent unlocking operations ensued.

Step S25 is an optional step. When an embodiment includes step S25, step S25 and step S26 may be executed at any order. For example, steps S25 and S26 may be executed simultaneously. When an embodiment does not include step S25, the face image may be captured first to unlock the preset application; but the preset application will not be launched until the unlocking is successful.

In step S26, a front-facing camera of the mobile terminal is called to capture a face image.

In step S24, if there is a sliding-type event, it means that the front-facing camera has been exposed to the outside. In this state, the front-facing camera is activated to capture a face image; and the face image as captured is used as an unlocking key to unlock the application.

In this step, calling a front-facing camera of a mobile terminal to capture a face image may include: detecting whether there is a face in the current image frame of the camera; and capturing the face image when there is a face in the current image frame.

Here, detecting whether there is a face in the current image frame of the camera can be implemented through a classifier. Exemplary classifier suitable for this step are known in the art, the detail of which is not described herein.

In other embodiments, calling a front-facing camera of the mobile terminal to acquire a face image may include: loading an image capturing interface on which there is an imaging capturing control; and capturing a face image in response to the user's image capturing instruction triggered by the image capturing control. In this way, the user manually takes a picture of his face without a face detection process.

In step S27, the face image is used as an unlocking key to unlock the preset application.

If the captured face image fails to unlock the preset application, step S28 is executed; and if the captured face image succeeds to unlock the preset application, step S29 is executed.

In some embodiments, the manner for unlocking an application is by using the captured face image to automatically unlock the application, rather than conventional manners of using password, gesture or fingerprint, so that a user needs not perform any additional operation.

In some further embodiments, unlocking the preset application by using the face image includes: comparing features between the face image and a preset face image to obtain a comparison result; and unlocking the preset application when the comparison result indicates that the face image and the preset face image are from the same person; and if the comparison result indicates that the face image and the preset face image are from different persons, the unlocking of the preset application fails.

In these embodiments, the face image captured by the front-facing camera are compared with the preset face image in the mobile terminal to perform unlocking of the application. The application can only be successfully unlocked when the captured face image and the preset face image are from the same person, thereby ensuring security of the application.

Herein, comparing the features between the face image and a preset face image may include: calling a face recognition algorithm to compare features between the face image and the preset face image. For example, a face recognition algorithm may be preset in the mobile terminal system. When comparing the features, the captured face image is directly sent to the face recognition algorithm, which then determines whether the face features in the face image and those in the preset face image input in advance are consistent or not. If yes, it means that the face image and the preset face image are from the same person; and if not, it means that the face image and the preset face image are from different persons.

Here, the face recognition algorithm determines whether the face image and the preset face image are from the same person by extracting feature points from the face image and then comparing the feature points with those in the preset face image input in advance through a feature analysis method. The foregoing feature analysis method may be a geometric feature analysis method, a local feature analysis method, a feature face method, an elastic model method, a neural network method, or the like.

In some embodiments, the face recognition algorithm may be an existing face recognition algorithm, such as a face recognition algorithm provided by SenseTime or any other suitable face recognition algorithm commonly known in the art.

In some further embodiments, the method may include: preprocessing the face image prior to comparing the features between the face image and the preset face image. Image preprocessing may include: recognizing a face region in the face image; and cropping the face region in the face image to obtain a face image of a set size. Then, the comparison process is performed by using the face image of a set size.

In some further embodiments, the method may also include: setting a preset face image in advance.

Setting a preset face image in advance may include: acquiring a face image in advance, and saving the acquired face image as the preset face image.

Acquiring a preset face image may include the following two alternative embodiments.

In one embodiment, when the user opens an image capturing application, the mobile terminal loads an image capture interface on which there is an image capture control; and capturing a preset face image in response to the user's image capturing instruction triggered by the image capture control.

In the other embodiment, when the user opens the image capturing application, the mobile terminal detects whether there is a face in a current image frame of the camera; and the preset face image is acquired by capturing the image when there is a face in the current image frame of the camera.

The preset face image may be captured through a front-facing camera or a rear-facing camera.

After the preset face image is acquired, the preset face image may also be preprocessed. Preprocessing of the face images may include: recognizing a face region in the preset face image; and cropping the face region in the preset face image to obtain a face image having a set size.

The settings option of the mobile terminal may include an item for setting the preset face image through which the user may input the preset face image.

Further, the preset face image may include face images of the same user from different angles, so that a problem that the preset application cannot be unlocked due to the image angle is solved, thereby, improving the accuracy of the unlocking through the use of face images.

In step S28, a touch-based unlocking interface is output.

The unlocking interface may be a password unlocking interface, a gesture unlocking interface, or a fingerprint unlocking interface. When the face image unlocking fails, the touch-based unlocking interface may be presented to allow the user to unlock the application via other means. In such embodiments, the unlocking manners may include but are not limited to unlocking by password, gesture, and fingerprint, so that the diversity of the unlocking manners is increased.

Step S28 is an optional step. When an embodiment does not include step S28, the mobile terminal directly destroys the process of the already started preset application, and does not access the main interface of the preset application when the unlocking fails.

Further, the method may also include: receiving an unlocking key input by the user. The unlocking key includes, but is not limited to, a password, a gesture or a fingerprint, and may be set in advance to prepare for the subsequent touch unlocking.

Further, the method may also include: receiving an unlocking command input by the user through the unlocking interface, the unlocking command including, but not limited to, a password, a gesture and a fingerprint, comparing the unlocking command with the unlocking key; executing step S29 if the unlocking command and the unlocking key are the same; or outputting an unlocking failure prompt if the unlocking command and the unlocking key are different.

In step S29, the main interface of the preset application is accessed.

Figure 7:
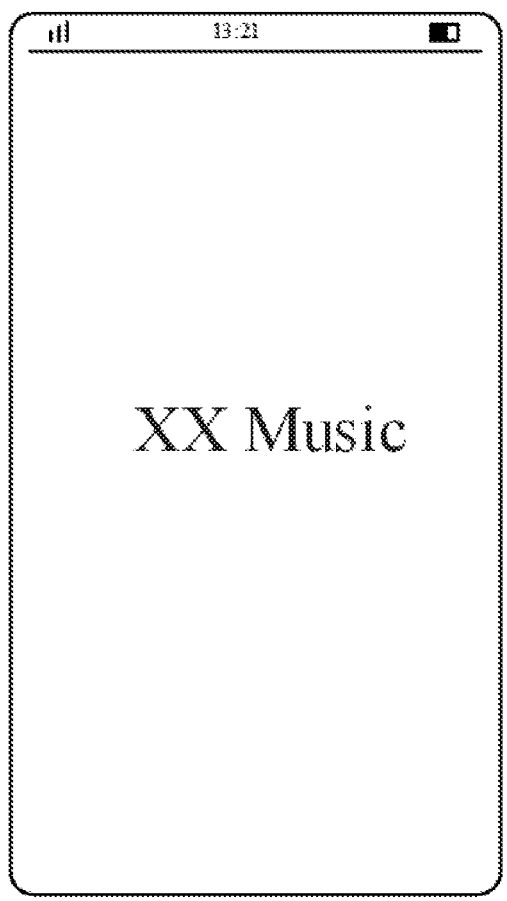
FIG. 7 is an exemplary starting interface view of a music application according to one embodiment.
Figure 8:
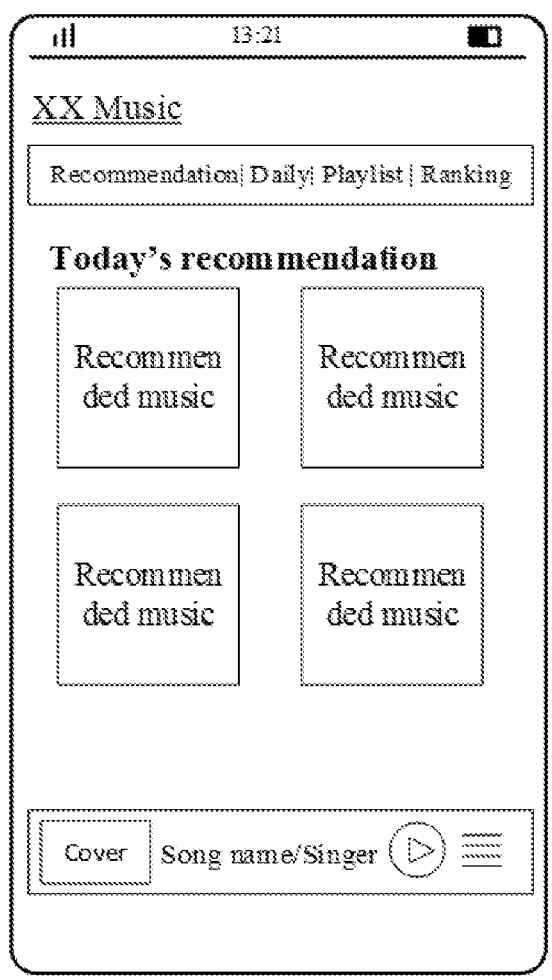
FIG. 8 is a schematic view of a main interface for the same music application.

The main interface of the preset application is displayed after a successful unlocking. For example, when the preset application is a music application, the main interface of the music application, such as a playlist interface, is displayed. FIG. 7 shows a starting interface of a music application. After the application is successfully unlocked, the main interface of the music application shown in FIG. 8 is accessed.

Figure 9:
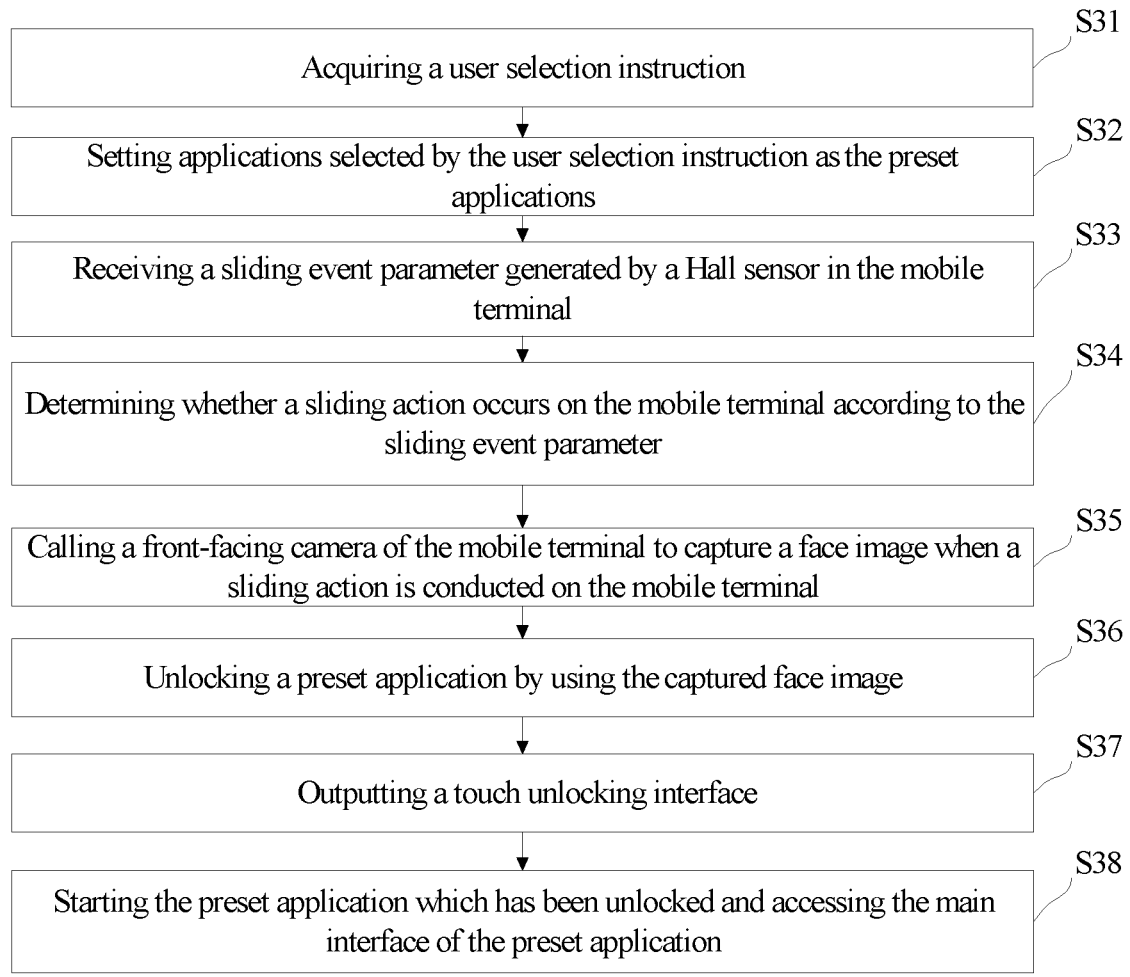
FIG. 9 is a flowchart of a method of unlocking applications on a mobile terminal with a sliding module according to one exemplary embodiment.

FIG. 9 is a flowchart of a method for unlocking applications according to one exemplary embodiment. The method is executed by a mobile terminal. In this exemplary embodiment, there are two or more preset applications. Referring to FIG. 9, the method for unlocking an application includes the following steps.

In step S31, user selection instruction is acquired.

This step differs from step S21 in that the user can select two or more preset applications through the user selection instruction.

In step S32, the applications selected by the user selection instruction are set as the preset applications.

The difference between step S32 and step S22 is that the preset applications are two or more preset applications.

In one embodiment, when there are two or more applications, the mobile terminal may perform unlocking of the multiple preset applications in sequence, for example, unlocking a first preset application for the first time, and unlocking a second application for the second time, etc.

In the above embodiment, the process of unlocking applications on the mobile terminal is similar to that shown in FIG. 5. The mobile terminal records the number of times of the sliding action and a sequence of the preset applications, and then sequentially unlocks the preset applications according to the number of times of the sliding action. For example, the mobile terminal may unlock a first preset application based on a first sliding action, and unlock a second preset application based on a second sliding action, etc. In this way, a wider range of preset applications can be unlocked based on the sliding action. The manner of each unlocking of a preset application may refer to the process shown in FIG. 5, and details are not repeated herein.

In another embodiment, when there are two or more applications, the two or more applications may respectively correspond to different face images, and the mobile terminal may unlock an application in accordance with the corresponding acquired face image. The detailed unlocking process of this exemplary embodiment is explained in the following steps.

In step S33, a sliding event parameter generated by a Hall sensor in the mobile terminal is received.

The process of this step is the same as that of step S23 described above.

In step S34, whether a sliding action has occurred is determined according to the sliding event parameter.

The process of this step is the same as that of step S24 described above.

In step S35, when a sliding action occurs, the front-facing camera of the mobile terminal is called to capture a face image.

The process of this step is the same as that of step S26 described above.

In step S36, the preset applications are unlocked by using the captured face image.

If the captured face image fails to unlock the preset application, step S37 is executed. If the captured face image succeeds in unlocking the preset applications, step S38 is executed immediately thereafter.

In some embodiments, two or more preset applications are set in the mobile terminal, and each preset application corresponds to one face image. That is, there are preset face images from two or more users. Thus, different preset applications in the mobile terminal can be unlocked by different users.

The unlocking process in step S36 includes: comparing features between the face image captured by the front-facing camera and the preset face image of each user sequentially. When there is a match between a preset face image and the face image captured by the front-facing camera, a preset application corresponding to the preset face image is determined and unlocked. Then, the mobile terminal starts the preset application.

In this embodiment, a correspondence between the preset face images and the preset applications needs to be saved in advance so that it can be used by the mobile terminal when unlocking the preset applications.

The feature comparison process and the acquisition process of the preset face image in this step are the same as those in step S27 described above.

In step S37, a touch unlocking interface is presented.

The process of this step is the same as that of step S28 described above.

In step S38, the unlocked preset application is started, and a main interface of the preset application is presented.

Here, the unlocked preset application is the preset application corresponding to the preset image that is from the same person as the face image captured by the front-facing camera.

The process of this step is the same as that of step S29 described above.

Figure 10:
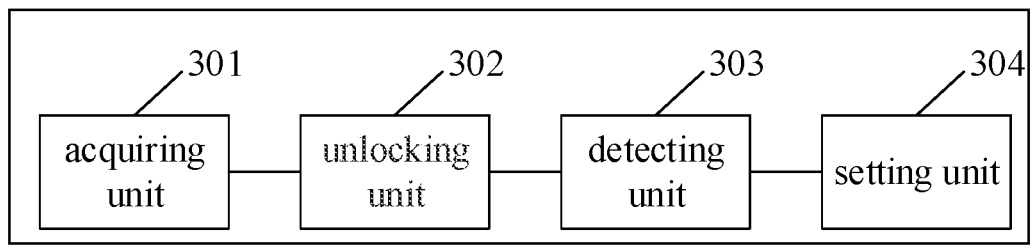
FIG. 10 is a block diagram illustrating the architecture of a mechanism for unlocking an application on a mobile terminal according to one exemplary embodiment.

FIG. 10 is a block diagram showing an exemplary architecture of a mechanism for unlocking an application on a mobile terminal according to embodiments disclosed herein. Referring to FIG. 10, the mechanism for unlocking an application includes an acquiring unit 301 and an unlocking unit 302.

The acquiring unit 301 is configured to call a front-facing camera of a mobile terminal to capture a face image in response to a sliding action applied on the sliding module. The unlocking unit 302 is configured to unlock a preset application by using the captured face image.

Optionally, the acquiring unit 301 is configured to detect whether there is a face in the current image frame of the front-facing camera, and capture the face image when there is a face in the current image frame of the front-facing camera.

Optionally, the unlocking unit 302 is configured to compare features between the captured face image and a preset face image to obtain a comparison result, unlock the preset application when the comparison result indicates that the face image and the preset face image are from the same person, and show that the unlocking of the preset application fails when the comparison result indicates that the face image and the preset face image are from different persons.

Optionally, the unlocking unit 302 is further configured to start the preset application in response to the sliding action on the mobile terminal, and unlock the preset application in the starting process thereof when the comparison result indicates that the captured face image and the preset face image are from the same person.

Optionally, the unlocking unit 302 is configured to determine a preset application corresponding to a preset face image that is from the same person as the face image when there are at least two preset applications set in the mobile terminal. The unlocking unit 302 is further configured to start the preset application and present the main interface thereof.

Optionally, the unlocking unit 302 is further configured to show that the unlocking of the preset application fails and present a touch-based unlocking interface as an alternative when the comparison result indicates that the face image and the preset face image are from different persons.

In some embodiments, the mechanism further includes a detecting unit 303. The detecting unit 303 is configured to receive a sliding event parameter generated by a Hall sensor in the mobile terminal, and determine whether a sliding action has occurred based on the sliding event parameter.

In some further embodiments, the mechanism further includes a setting unit 304. The setting unit 304 is configured to acquire a user selection instruction used as a directive to select an application and set the selected application as a preset application.

Reference is made to step S26 for a description of the manner through which the acquiring unit 301 captures the face image. Similarly, reference to step S27 is made for a description of the manner through which the unlocking unit 302 unlocks the preset application.

Figure 11:
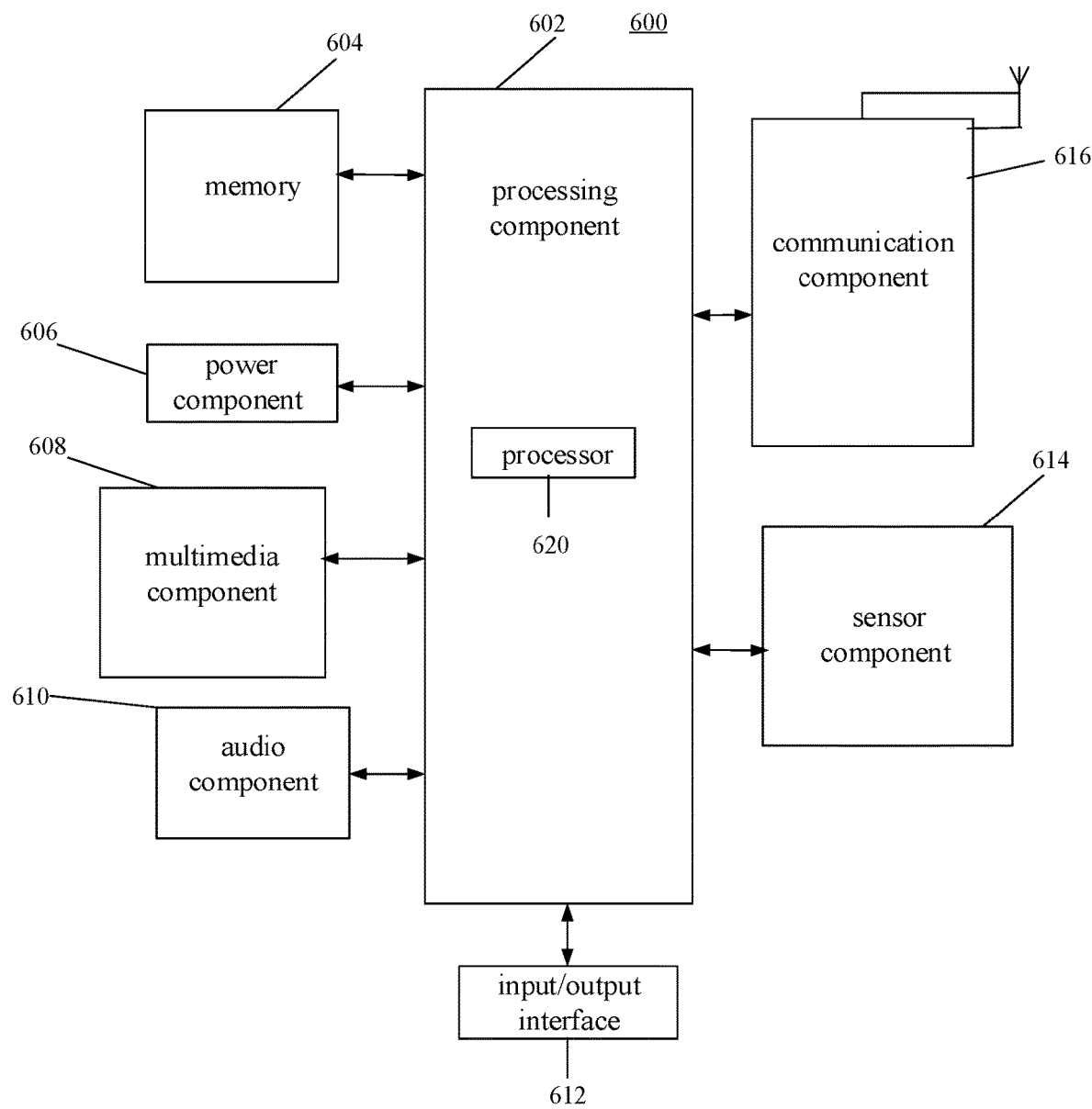
FIG. 11 is a block diagram of a device configured with a mechanism for unlocking an application on a mobile terminal according to one exemplary embodiment.

FIG. 11 is a block diagram of a device 600 having a mechanism for unlocking an application according to one exemplary embodiment. The device 600 may be a mobile phone as mentioned above. Referring to FIG. 11, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls the overall operations of the device 600, such as operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation on the device 600. Examples of such data include instructions for any applications or methods operating on the device 600, contact data, phonebook data, messages, pictures, videos, etc. The memory 604 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 608 includes a front-facing camera and/or a rear-facing camera. The front-facing camera and the rear-facing camera may receive external multimedia data while the device 600 is in an operation mode, such as an image capture mode or a video mode. Each of the front-facing camera and the rear-facing camera may be a fixed optical lens system or have focus and optical zoom capability.

The audio component 610 is configured to output and/or input audio signals. For example, the audio component 610 includes a microphone (MIC) configured to receive external audio signals when the device 600 is in an operation mode, such as a call mode, a recording mode, and a voice recognition mode. The received audio signal may be further stored in the memory 604 or transmitted via the communication component 616. In some examples, the audio component 610 further includes a speaker for outputting audio signals.

The I/O interface 612 provides an interface between the processing component 602 and peripheral interface modules, such as an unlocking keyboard, a click wheel, buttons, and the like. The buttons may include, but are not limited to, a home button, a volume button, a start button, and a lock button.

The sensor component 614 includes one or more sensors to provide status assessments of various aspects of the device 600. For instance, the sensor component 614 may include a Hall sensor for detecting the sliding action applied on the sliding module of the device 600. The sensor component 614 may detect an on/off status of the device 600, relative positioning of components, e.g., the display device and the mini keyboard of the device 600, and the sensor component 614 may also detect a position change of the device 600 or a component of the device 600, presence or absence of user contact with the device 600, orientation or acceleration/deceleration of the device 600, and temperature changes in the device 600. The sensor component 614 may include a proximity sensor configured to detect the presence of nearby objects without any physical contact. The sensor component 614 may also include a light sensor, such as a CMOS or CCD image sensor, used for imaging applications. In some examples, the sensor component 614 may also include an accelerometer sensor, a gyroscope sensor, a magnetic sensor, a pressure sensor, or a temperature sensor.

The communication component 616 is configured to facilitate communication, in a wired or wireless manner, between the device 600 and other devices. In an exemplary embodiment, the communication component 616 can access a wireless network based on a communication standard, such as 2G, 3G, 4G, or 5G, or a combination thereof, so as to implement a physical downlink control signaling detection. In one embodiment, the communication component 616 receives broadcast signals or broadcast associated information from an external broadcast management system via a broadcast channel. Optionally, the communication component 616 further includes a near field communication (NFC) module.

In some embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method for unlocking an application.

In some embodiments, a non-transitory computer-readable storage medium including instructions is also provided, such as the memory 604 including instructions, executable by the processor 620 in the device 600, for performing the above-described method for unlocking an application. For example, the non-transitory computer-readable storage medium may be a ROM, a RAM, a CD-ROM, a magnetic tape, a floppy disc, an optical data storage device, and the like.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "up" or "down" or "left" or "right" or "below" or "above" or "upper" or "lower" or "horizontal" or "vertical" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a ROM, a RAM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for unlocking an application on a mobile terminal having a sliding module, comprising:
   starting the application, and calling a front-facing camera disposed on the sliding module of the mobile terminal to acquire a face image of a user in response to a sliding action applied on the sliding module to be in a protruding state; and
   unlocking the application by using the captured face image as an access key, wherein said application is a preset application,
   wherein the mobile terminal has at least two preset applications, and said unlocking the application comprises:
   determining, according to a number of times of the sliding action applied on the sliding module to be in the protruding state and a preset sequence of the at least two preset applications, a target preset application corresponding to the number of times of the sliding action, and
   unlocking the target preset application,
   wherein different target preset applications are unlocked by using different face images as the access key.

2. The method of claim 1, wherein the calling a front-facing camera comprises:

detecting whether there is a face in the camera's current image frame; and
capturing the face image if there is a face in the camera's current image frame.

3. The method of claim 1, wherein the step of unlocking the application comprises:
comparing features between the captured face image and a preset face image to obtain a comparison result; and
unlocking the preset application if the comparison result indicates that the captured face image and the preset face image are from the same person.

4. The method of claim 3, further comprising:
starting the preset application in response to the sliding action and unlocking the preset application as part of the starting process of the preset application.

5. The method of claim 3, wherein the mobile terminal has at least two preset applications and the step of unlocking the preset application comprises:
selecting a preset application that corresponds to a preset face image matching the captured face image; and
starting the selected preset application and accessing a main interface of the selected preset application.

6. The method of claim 3, further comprising:
presenting a touch-based unlocking interface if the comparison result indicates that the captured face image and the preset face image are from different persons.

7. The method of claim 1, further comprising:
receiving a sliding event parameter generated by a Hall sensor in the mobile terminal; and
determining whether a sliding action has occurred according to the sliding event parameter.

8. The method of claim 1, further comprising:
acquiring a user selection instruction encoding a selection of an application as a preset application; and
setting the application selected by the user selection instruction as the preset application.

9. A device having a mechanism for unlocking an application on the device, comprising:
a sliding module having a front-facing camera disposed thereon;
a processor; and
a memory configured to store instructions executable by the processor,
wherein the processor is configured to perform:
starting a preset application in response to a sliding action being applied on the sliding module to be in a protruding state thereby exposing the front-facing camera;
calling the front-facing camera to acquire a face image, and
unlocking the preset application by using the face image as an unlocking key,
wherein the mobile terminal has at least two preset applications, and said unlocking the preset application comprises:
determining, according to a number of times of the sliding action applied on the sliding module to be in the protruding state and a preset sequence of the at least two preset applications, a target preset application corresponding to the number of times of the sliding action, and
unlocking the target preset application,
wherein different target preset applications are unlocked by using different face images as the access key.

10. The device of claim 9, wherein the calling a camera comprises:
detecting whether there is a face in the camera's current image frame; and
capturing the face image if there is a face in the current image frame of the camera.

11. The device of claim 9, wherein the step of unlocking a preset application comprises:
comparing features between the captured face image and a preset face image to obtain a comparison result; and
unlocking the preset application if the comparison result indicates that the captured face image and the preset face image are from the same person.

12. The device of claim 11, wherein the processor is further configured to perform:
starting the preset application in response to the sliding action applied on the sliding module and unlocking the preset application as part of the starting process.

13. The device of claim 11, wherein the device has at least two preset applications and the step of unlocking the preset application comprises:
selecting a preset application that corresponds to a preset face image matching the captured face image from the same person as the face image; and
starting the selected preset application and accessing a main interface of the selected preset application.

14. The device of claim 11, wherein the processor is further configured to perform:
presenting a touch-based unlocking interface if the comparison result indicates that the captured face image and the preset face image are from different persons.

15. The device of claim 9, wherein the processor is further configured to perform:
receiving a sliding event parameter generated by a Hall sensor adapted to detect a sliding action of the sliding module; and
determining whether a sliding action has occurred according to the sliding event parameter.

16. The device of claim 9, wherein the processor is further configured to perform:
acquiring a user selection instruction for selecting an application; and
setting the application selected by the user selection instruction as the preset application.

17. A non-transitory computer-readable storage medium having encoded thereon computer executable instructions for a method of unlocking an application on a mobile terminal having a sliding module, the method comprising:
starting the application, and calling a front-facing camera disposed on the sliding module of the mobile terminal to capture a face image in response to a sliding action applied on the sliding module to be in a protruding state; and
unlocking the application by using the captured face image as an unlocking key, wherein said application is a preset application,
wherein the mobile terminal has at least two preset applications, and unlocking the application comprises:
determining, according to a number of times of the sliding action applied on the sliding module to be in the protruding state and a preset sequence of the at least two preset applications, a target preset application corresponding to the number of times of the sliding action, and
unlocking the target preset application,
wherein different target preset applications are unlocked by using different face images as the access key.

18. A mobile terminal comprising a processor configured to perform the method according to claim 1, the mobile terminal further comprising:

a sliding module having a front-facing camera disposed thereon;
wherein the sliding module is configured to hide or expose the front-facing camera in response to a sliding action applied on the sliding module.

19. The mobile terminal of claim 18, wherein the sliding module is configured to hide or expose the front-facing camera by sliding in or out of a frame of the mobile terminal.

20. The mobile terminal of claim 18, wherein the sliding module is configured to hide or expose the front-facing camera by turning a portion of a screen of the mobile terminal opaque or transparent.

\* \* \* \* \*